United States Patent Office 3,290,359
Patented Dec. 6, 1966

3,290,359
POLYHALO-BICYCLIC COMPOUNDS AND OXYGENATED DERIVATIVES

Victor Mark, Norristown, Pa., assignor to Monsanto Company, a corporation of Delaware No Drawing. Filed Dec. 11, 1963, Ser. No. 329,912
6 Claims. (Cl. 260—488)

This application is a continuation-in-part of copending application Serial No. 132,570 filed August 21, 1961, now abandoned, which is a continuation-in-part of Serial No. 44,890 filed July 25, 1960.

This invention relates to new chemical compounds and to methods of their synthesis. More specifically, the invention is directed to new Diels-Alder type adducts of unusual value. The preparation involves the adduction of substituted halocyclopentadienes and certain types of olefins.

It is well known that hexachlorocyclopentadiene can be reacted with olefins to form adducts which are toxic to living organisms. Although many of these are very toxic to most insects, they are dangerous to use because of their mammalian toxicity. In the use of these compounds, insect toxicity is frequently sacrificed in favor of safety to operating personnel.

It is a fundamental purpose of this invention to provide new biological toxicants with greatly reduced mammalian toxicity, but without serious loss of toxicity to microorganisms. A further purpose is to make available active insecticides, fungicides and herbicides which are relatively safe to use. Other purposes will be apparent from the following description of the preparation and use of the new biologically active compounds.

In copending applications, Serial Number 44,890 filed July 25, 1960 and Serial Number 132,570 filed August 21, 1961, and now abandoned, by Victor Mark, of which this is a continuation-in-part, there is described a family of halocyclopentadienes which have one or more organic radicals substituted on the cyclopentadiene ring at least one of which is in the allylic position (i.e. on the carbon atom which is not involved in an unsaturated bond). The novel method by which the new compounds are prepared is also claimed therein. These compounds are used in the practice of the present invention and are in accordance therewith adducted to olefins having certain structural configurations.

It is well known that the Diels-Alder adduction involves the reaction of a diene with an unsaturated compound. It is further known that hexachlorocyclopentadienes react in this manner with a wide variety of unsaturated compounds. In accordance with the present invention it has been found that compounds of quite different and valuable properties are prepared by the use of the substituted hexahalocyclopentadienes described in the earlier filed application.

These reactants are represented by the structural formula wherein the X's represent halogen atoms of the group consisting of chlorine, bromine, fluorine and iodine; subscript *m* being an integer from zero (0) to one (1); and wherein each R is a radical selected from the class consisting of hydrocarbon radicals having up to 20 carbon atoms selected from the group consisting of alkyl radicals such as methyl, ethyl, n-propyl, isopropyl, butyl, isobutyl, sec-butyl, tert-butyl, hexyl, 2-ethylhexyl, decyl, dodecyl and octadecyl radicals; alkenyl radicals, such as vinyl, allyl, methallyl, crotyl, 2-hexenyl, 10-undecenyl and 2-hexadecenyl radicals; the alkynyl radicals, such as ethynyl, propargyl, 2-butynyl, 8-decynyl and 2-octadecynyl radicals; the cycloalkyl radicals, such as cyclopropyl, cyclobutyl, cyclopentyl, cyclohexyl, cyclooctyl, norbornyl, tricyclo-$[2,2,1,0^{2,6}]$-hept-3-yl and cyclopropylmethyl radicals; the cycloalkenyl radicals, such as 3-cyclopentenyl, 2-cyclohexenyl, 2-cycloheptenyl, cyclooctenyl, 2-norbornen-5-yl, and nopyl radicals; the aryl radicals, such as phenyl, biphenylyl, naphthyl, triphenylmethyl and anthracyl radicals; the alkaryl radicals, such as p-tolyl, 2,4-dimethyl-phenyl, 7-methyl-1-naphthyl, p-ethylbiphenylyl and 10-ethyl-9-anthracyl radicals; the alkenaryl radicals, such as p-allylphenyl, m-methallylphenyl, p-hexadecenylphenyl and the corresponding substituted naphthyl and biphenyl radicals; the alkyl substituted cycloalkyl radicals, such as 4-dodecylcyclohexyl and the 2-ethylcyclopentyl radicals; the alkenyl substituted cycloalkyl radicals, such as 2-allyl-cyclopentyl; the alkynyl substituted cycloalkyl radicals, such as 4-propargylcyclohexyl, ethynylcyclopentyl; the alkyl cycloalkenyl radicals, such as 3-ethyl-2-cycloheptenyl; the alkenylcycloalkenyl radicals, such as 4-allyl-2-cyclohexenyl and 4-vinyl-2-cyclohexenyl; the alkynylcycloalkenyl radicals, such as 4-propargyl-2-cyclohexenyl; the aralkyl radicals, such as benzyl, 2-phenethyl and indenyl radicals; the aralkenyl radicals, such as cinnamyl and styryl radicals; the aralkynyl radicals, such as 3-phenylpropargyl; the cycloalkyl substituted alkyl, such as 3-cyclohexylpropyl; the cycloalkyl substituted alkenyl radicals, such as 3-cycloheptylallyl, and 3-cyclopentylmethallyl radicals; the cycloalkyl substituted alkynyl radicals, such as 3-cyclooctylpropargyl and 10-cyclohexyldecynyl radicals; the cycloalkenylalkyl radicals, such as 2(2-cyclopentyl)ethyl and 2(1-cyclohexenyl)methyl; the cycloalkenyl substituted alkenyl radicals, such as 4(1-cyclopentenyl)-2-butenyl and the 2(1-cyclohexenyl)vinyl radicals; the cycloalkenyl substituted alkynyl radicals, such as the 3(2-cyclohexenyl) propargyl radical; the alkyl substituted aralkyl radicals, such as p-ethylbenzyl; the alkenyl substituted aralkyl radicals, such as p-allylphenethyl; the alkynyl substitued aralkyl radicals, such as 10(p-propargylphenyl)decyl; the alkyl substituted aralkenyl radicals, such as 2,4-dimethylcinnamyl; the alkenyl substituted aralkenyl radicals, such as the p-allylstyryl radicals; and the said hydrocarbon radicals containing substituents of the group consisting of chlorine, as in 2-chloroethyl and p-chlorobenzyl; bromine, as in 4-bromobutyl; fluorine, as in 2,2,2-trifluoroethyl; iodine, such as in 2,4,6-tri-iodobenzyl; alkoxy, such as in 2-methoxyethyl and p-isopropoxybenzyl; aryloxy, such as in 2-phenoxyethyl and p-methoxybenzyl; nitro, such as in o-nitrobenzyl; cyano, such as in 2-cyanoethyl; thiocyano, such as in 3-thiocyanoallyl; isocyano, such as in m-isocyanophenyl; mercapto, such as in p-mercaptobenzyl; hydroxyl, such as in 3-hydroxypropyl; acyloxy, such as o-acetyloxybenzyl; isothiocyano, such as in 2-isothiocyanoethyl; acyl, such as in p-acetylphenyl; hydrocarbonoxy carbonyl, such as the methyl ester of p-carboxybenzyl; the alkylthio, such as 2-methylthiopropyl; arylthio, such as in phenylthiomethyl; aralkylthio, such as in 2-benzylthioethyl; amino, such as in 2-aminoethyl; hydrocarbon amino, such as in 2-dimethylaminoethyl; hydrocarbon sulfonyl, such as in 2-isopropylsulfonylethyl; hydrocarbon sulfinyl, such as in 2-phenylsulfinylethyl; furyl, such as in furfuryl; thienyl, such as in thenyl; pyridyl, such as in 2-pyridylethyl; piperidyl, such as in 4-piperidyl; glycidyl, such as in glycidyl and glycidylmethyl; morpholyl, such as in 2(2-morpholyl)ethyl; tetrahydrofuryl, such as in tetrahydrofurfuryl; dihydrofuryl, such as dihydrofurfuryl; tetrahydrothienyl, such as tetrahydrothenyl; dihydrothenyl; such as in dihydrothenyl; the hydrocarbon and acyl groups of the said substituents having up to 20 carbon atoms.

This invention involves the adduction of the above identified polyhalocyclopentadienes with organic compounds containing carbon to carbon unsaturated bonds, hereinafter designated as the dienophiles, said polyhalocyclopentadienes having at least one organic radical on the allylic carbon atom (one that is not involved in a carbon to carbon double bond). The halogen substituents on the polyhalocyclopentadiene may be chlorine, bromine, fluorine, or iodine and may be the same or different halogen atoms on the cyclopentadiene molecule.

The conditions of reaction between the described cyclopentadienes and the dienophiles are dependent upon the nature and relative reactivity of the reactants. The reaction may be conducted at room temperature and atmospheric pressures, but a wide range of conditions are practicable, usually higher than room temperatures and often higher than atmospheric pressures are required with most reactants.

When the dienophile is very reactive, the simple mixing of the reactants at or below room temperature initiates the reaction. Cooling is then necessary to keep the reactants in liquid form and within the temperature range desired for optimum conversion. It is convenient often to confine the reaction mixture in a closed system to prevent the escape of the volatile component. The use of closed vessels (autoclaves) is especially desirable when the dienophile is gaseous at room temperature. Furthermore, when the reaction partners do not readily interact, the application of heating may be desirable to increase the rate of adduction; this often is done in autoclaves and under autogenous pressures.

The reaction often is conducted in the presence of appropriate solvents. These may have multiple beneficial effects. For instance, a liquid with good solvent properties for the less soluble component might increase the effective concentration, and the rate of the reaction. A liquid often is used when an internal coolant is needed to keep the temperature within a narrow range. By choosing a liquid with a boiling point close to the temperature required for the reaction, the danger of overheating is greatly reduced because the refluxing liquid dissipates the heat of the reaction. Suitable insert solvents are hydrocarbons (benzene, toluene), ethers, halogenated solvents (chlorobenzene) and the like.

The use of catalysts is often desirable in order to speed up the rate of conversion of sluggish reactants. Lewis acids, such as those used in the Friedel-Crafts reaction, are especially useful catalysts. These include $AlCl_3$, $BF_3$, $SbCl_3$, $FeCl_3$, etc.

Further details in the preparation of the new compounds are set forth hereinafter in specific examples.

The new compounds are prepared by Diels-Alder synthesis using aliphatic ethylenic compounds as the dienophile for adduction to the halocyclopentadiene with the organic substituent to produce a compound of the structure

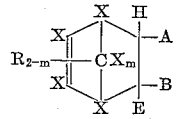

wherein R, m and X are as defined above, wherein at least one of A, B and E is hydrogen, and wherein A, B and E are as hereinafter defined.

Dienophiles useful in the practice of this aspect of the invention will have the structure

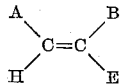

at least one of A, B and E is hydrogen and are each selected from the group consisting of hydrogen, such as in ethylene; alkyl, such as in propene, isobutene, 1-pentene, 2-pentene, 2-hexene, octadecene and 2-butene; alkenyl, such as in propadiene (allene), butadiene, 1,4-pentadiene, isoprene; alkynyl, such as in vinylacetylene and 3-methyl-3-butene-1-yne; aryl such as in styrene and stilbene; aralkyl, such as in allylbenzene and 1,4-diphenyl-2-butene; alkaryl, such as in 1,2-bis(p-tolyl)-ethylene and p-dodecylstyrene; cycloalkyl, such as in cyclohexylethylene, 2-cyclopentyl-1-propene and methylenecyclohexane; chlorine, such as in vinylchloride, trans-1,2-dichloroethylene, cis-1,2-dichloroethylene; allyl chloride; bromine, such as in 2-bromo-1-propene, 1,2-dibromoethylene and vinyl bromide, allyl bromide; fluorine, such as in vinylidenefluoride and vinyl fluoride; iodine, such as in vinyliodide; nitro, such as in m-nitrostyrene, nitroethylene and 3-nitroallyl alcohol; cyano, such as in acrylonitrile, allyl cyanide and cinnamonitrile; aldehyde, such as in acrolein, crotonaldehyde and cinnamonaldehyde; carboxy, such as in acrylic acid, undecenoic acid and maleic anhydride; thiocyano, such as in thiocyanoethylene and 1,2-dithiocyanoethylene; isocyano; —OY, wherein Y is selected from the group consisting of chlorine and hydrocarbon of up to 20 carbon atoms, such as in vinylmethylether, vinyltetradecylether, divinylether and vinylbenzylether; —SY, such as in phenyl vinyl sulfide and vinyl-2-ethylhexylsulfide;

such as divinylsulfoxide, phenylvinyl sulfoxide and dodecylvinylsulfoxide;

such as in p-chlorophenylvinylsulfone and methylvinylsulfone;

such as in methyl vinyl ketone and divinyl ketone;

such as in phenyl 1-butenylthioketone;

such as in methyl acrylate, diisopropyl maleate, tetradecyl methacrylate; fumaroyl chloride and dibutyl fumarate;

such as vinylacetate, vinylene dibutyrate, vinylene carbonate; —$NY_2$, such as dimethyl 1-propenyl amine and divinyl hexadecyl amine; —$Si(OY)_3$, such as in vinyltrichlorosilane, triethoxyvinylsilane,

such as in dimethylvinylphosphine;

such as in decyl divinyl phosphite;

such as in ethyl vinyl phenylphosphonite and in dimethyl vinylphosphonite;

such as in isopropenyl diphenylphosphinite and methyl vinylphosphonite;

$$-SP\begin{matrix}SY\\SY\end{matrix}$$

such as in trivinyltrithiophosphite;

$$(Y_2N)_2-P-\overset{Y}{\underset{}{N}}-$$

such as in pentamethylvinyl phosphorous triamide; dimethoxytetradecyloxy-1-butenylsilane; —OSi(OY)$_3$, such as in isopropenyl triethyl ortho-silicate and vinyl diethyl benzyl ortho-silicate; —BY$_2$, such as in diethyl vinyl borine and methyloctadecyl isopropenylborine;

$$-OB(OY)_2$$

such as in vinyldiethyl borate and 1-butenyldidecyl borate; —SnY$_3$, such as in vinyltriethyl tin and isopropenyl tin; the hydrocarbon radicals, Y containing substituents selected from the group consisting of chlorine substituents, such as in allylchloride, cinnamyl and 1,4-dichloro-2-butene; bromine substituents, such as in 3-bromo-1-propene and 1,4-dibromo-2-butene; fluorine substituents such as in p-trifluoromethylstyrene and 1(o-fluorophenyl)-2-propyne; iodine, such as in 2,4,6-triiodocinnamic alcohol; hydroxyl substituents, such as in allyl alcohol, cis-2-butene-1,4-diol and undecylenyl alcohol; mercapto substituents, as in 2-propen-1-thiol and 1,6-dimercapto-3-hexene; nitro substituents, such as in 4-nitro-1-butene, p-nitrostyrene; cyano substituents, such as in acrylonitrile, 3-cyano-1-propene and p,p'-di(cyanophenyl)-1,2-ethylene; aldehydo substituents, such as in 1-butyroaldehyde and 1,2-fumaroaldehyde; carboxy substituents, such as in crotonic acid, vinyl acetic acid and teracrylic acid; thiocyano substituents, such as in 3-thiocyano-1-propene and p-thiocyanostyrene; isothiocyano as in allyl isothiocyanate; isocyano substituents, such as in 1,4-diisocyano-2-butene and o-isocyanostyrene; isothiocyano substituents, such as in 3-isothiocyano-1-butene and p-isothiocyanobenzylethylene and hydroxyl substituents such as in allyl alcohol and 2-buten-1,4-diol; —OY substituents, such as in ethylallylether and 1-butenyldodecylether; —SY substituents, such as in allylcyclohexylether;

$$-\overset{O}{\underset{}{S}}Y$$

substituents, such as in phenylsulfinyl-2-butene and cinnamyl-p-phenylsulfinylstyrene;

$$-\overset{O}{\underset{O}{S}}Y$$

substituents, such as in ethylallylsulfone and phenylsulfonylstyrene;

$$-\overset{O}{\underset{}{C}}Y$$

substituents, such as in allylmethylketone and 2-butenyltetradecylketone;

$$-\overset{S}{\underset{}{C}}Y$$

substituents, such as in allylmethylthioketone and oleylmethylthioketone;

$$-\overset{O}{\underset{}{C}}OY$$

substituents such as in diethylitaconic acid and hexadecylisocrotonate;

$$-O\overset{O}{\underset{}{C}}Y$$

substituents, such as in 2-butene-1,4-diacetate, methyl oleate and 1-decene oleate; —NY$_2$ substituents, such as in allyldimethylamine and 2-butene-1,4-di(dimethylamine); —Si(OY)$_3$ substituents, such as in allyltrimethoxysilane, dichloroethylallyl silane and 2-butene-1,4-di(tridodecyloxy)silane; —OSi(OY)$_3$ substituents, such as in allyltrimethyl-o-silicate and oleyltriethyl-o-silicate;

$$-\overset{O}{\underset{}{P}}(OY)_2$$

substituents, such as in dimethyl oleylphosphonate and di-2-ethylhexyl allylphosphonate; —P(OY)$_2$ substituents, such as in 2-butene(dimethyl phosphonite) and 2-didodecylallyl phosphonite; —OP(Y)$_2$ substituents such as in vinylidenedi(diisopropylphosphate) and ditetradecyl allylphosphate; —OP(OY)$_2$ substituents, such as in 3-butynyldipentyl phosphite and allyldihexadecyl phosphite;

$$-B(OY)_2$$

substituents such as in dimethyl allylboronate and didecyl styryl borate; —OB(OY)$_2$ substituents such as in allyldihexadecyl borate and dimethyllinoleyl borate; and the —SnY$_3$, such as in allyltriphenyl tin and oleyltrimethyl tin.

A preferred class of the new compounds disclosed and claimed may be represented by the structural formula wherein X is selected from the class consisting of chlorine and bromine; wherein R is a radical selected from the group consisting of alkyl radicals of up to eight carbon atoms, alkenyl radicals of up to eight carbon atoms, chloroalkyl radicals of up to eight carbon atoms and having the alpha carbon atom free of chlorine, and oxaalkyl radicals of up to eight carbon atoms; and wherein Y is selected from the class consisting of X and R radicals; and wherein A and B are selected from the group consisting of chlorine, chloromethyl, hydroxymethyl, acetyloxymethyl, phenyl and hydrogen.

The above compounds can be prepared by the adduction of halocyclopentadiene containing the described organic substituents with dienophiles by the following procedures.

*Example 1*

Vinylchloride was introduced subsurface into a flask containing pentachloro-5-methylcyclopentadiene kept at between 200 and 210° C. until the theoretical amount of weight gain was obtained. 1,2,3,4,5,7-hexachloro-7-methyl-2-norbornene was obtained in form of a soft crystalline mass, M.P. 140–144° C.

*Example 2*

The procedure of Example 1 was repeated except that the vinyl chloride was adducted with 1,2,3,4,5-pentachloro-5-methoxypropylcyclopentadiene. A compound of the following structure was obtained:

*Example 3*

A stoichiometric mixture of allyl chloride and pentachloro-5-(2-ethylhexyl)cyclopentadiene was charged to a pressure bottle and heated at 150° C. for six hours. 1,2,3,4,7-pentachloro - 5(chloromethyl)-7-(2-ethylhexyl)-norbornene was obtained in 44% conversion in form of a high boiling oil.

*Example 4*

A solution of pentachloro-5-ethylcyclopentadiene and the equivalent amount of cis-2-butene-1,4-diol in dioxane was refluxed for a period of 20 hours at 118° C. 1,4,5,6,7-pentachloro - 7-ethyl - 5-norbornene-2,3-dimethanol was obtained in form of white crystals, M.P. 113–116° C.

*Example 5*

A mixture of 80.0 g. (0.30 mole) of pentachloro-5-ethylcyclopentadiene and 51.6 g. (0.30 mole) of cis-2-butene-1,4-diol diacetate was heated between 190 and 230° C. for a period of 7 hours. The adduct, 1,4,5,6,7-pentachloro - 7-ethyl-5-norbornene-2,3-dimethanol diacetate, boiling at 184° C. at 1 mm., $n_D^{25}$ 1.5239, was obtained in 95% yield (68% conversion).

*Example 6*

The adduction of ethyl vinyl phenylphosphonate to 1,2,3,4,5-pentachloro - 5-allylcyclopentadiene by the procedure described in Example 5 yielded a compound of the structure:

*Example 7*

Cis-stilbene may be adducted with 1,2,3,4,5-pentachloro-5-n-propylcyclopentadiene using the procedure of Example 5 to form a compound of the structure:

*Example 8*

A mixture of 44.1 g. (0.15 mole) of 5-butylpentachlorocyclopentadiene and 25.8 g. (0.15 mole) of cis-2-butene-1,4-diol diacetate was kept between 147 and 167° C. for a period of 7 hours. 7-butyl-1,4,5,6,7-pentachloro-5-norbornene-2,3-dimethanol diacetate, boiling at 184° C. at 0.34 mm. pressure, $n_D^{25}$ 1.5165, was obtained in 29% conversion and 75% yield. Analysis calculated for $C_{17}H_{21}Cl_5O_4$: Cl, 38.00. Found: Cl, 38.56.

*Example 9*

A mixture of 45.0 g. (0.15 mole) of pentachloro-5(2-chloroethyl)cyclopentadiene and 25.8 g. (0.15 mole) of cis-2-butene-1,4-diol diacetate was heated between 147 and 166° C. for 7 hours. 1,4,5,6,7-pentachloro - 7(2-chloroethyl)-5-norbornene-2,3-dimethanol diacetate, B.P. 192° C. at 0.46 mm., $n_D^{25}$ 1.5330, was obtained in 60% yield. Analysis calculated for $C_{15}H_{16}Cl_6O_4$: Cl, 45.00 Found: Cl, 45.45.

*Example 10*

By the procedure of Example 1 ethylene was adducted with 1,2,3,4,5-pentachloro-5-methylcyclopentadiene and a compound was prepared with the structure:

The above examples represent preferred modifications of the invention and these will suggest further variations to one skilled in the art. Similarly, the following claims are directed to more useful modifications of the invention, but other compounds of the claims defined broadly will have similar utility.

What is claimed is:

1. A compound of the formula wherein R is a chloroalkyl radical of up to eight carbon atoms and having the alpha carbon atom free of chlorine; wherein A and B are each radicals of the structure wherein p is an integer from zero to one, n is an integer from zero to one, m is an integer from zero to one, provided that the sum of p, n and m is at all times one; and wherein q is an integer from zero to one.

2. A compound of the formula wherein R is an alkenyl radical of up to eight carbon atoms; wherein A and B are each radicals of the structure wherein p is an integer from zero to one, n is an integer from zero to one, m is an integer from zero to one, provided that the sum of p, n and m is at all times one, and wherein q is an integer from zero to one.

3. A compound of the structure
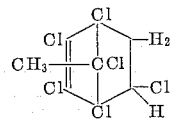
4. A compound of the structure
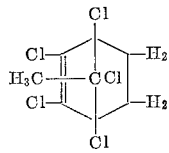
5. A compound of the structure
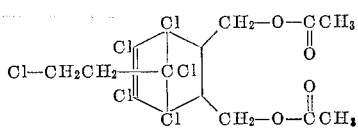
6. A compound of the structure
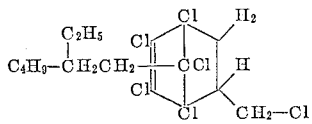
References Cited by the Examiner
UNITED STATES PATENTS
| | | | |
|---|---|---|---|
| 2,799,685 | 7/1957 | Frensch | 260—617 |
| 2,802,862 | 8/1957 | Senkbeil | 167—30 X |
| 2,841,484 | 7/1958 | Johnson | 260—488 X |
| 2,841,485 | 7/1958 | Johnson | 260—488 X |
| 2,912,356 | 11/1959 | Schmerling | 167—30 |
| 3,062,898 | 11/1962 | Hoch | 260—648 |
| 3,187,010 | 6/1965 | Levin et al. | 260—617 |
| 3,205,274 | 9/1965 | Mark | 260—648 |
LORRAINE A. WEINBERGER, *Primary Examiner.*
LEON ZITVER, *Examiner.*
D. P. CLARKE, V. GARNER, *Assistant Examiners.*